US011735364B2

United States Patent
Kim et al.

(10) Patent No.: US 11,735,364 B2
(45) Date of Patent: *Aug. 22, 2023

(54) MULTILAYER ELECTRONIC COMPONENT

(71) Applicant: SAMSUNG ELECTRO-MECHANICS CO., LTD., Suwon-si (KR)

(72) Inventors: Jun Hyeon Kim, Suwon-si (KR); Hae Sol Kang, Suwon-si (KR); Bon Seok Koo, Suwon-si (KR); San Kyeong, Suwon-si (KR); Chang Hak Choi, Suwon-si (KR); Jung Min Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/512,084

(22) Filed: Oct. 27, 2021

(65) Prior Publication Data

US 2022/0051853 A1 Feb. 17, 2022

Related U.S. Application Data

(63) Continuation of application No. 16/836,342, filed on Mar. 31, 2020, now Pat. No. 11,189,424.

(30) Foreign Application Priority Data

Sep. 4, 2019 (KR) .................. 10-2019-0109673

(51) Int. Cl.
*H01G 4/232* (2006.01)
*H01G 4/228* (2006.01)
(Continued)

(52) U.S. Cl.
CPC ......... *H01G 4/2325* (2013.01); *H01G 4/1218* (2013.01); *H01G 4/30* (2013.01); *H01G 4/306* (2013.01)

(58) Field of Classification Search
CPC . H01L 51/5206; H01L 51/5221; H01G 2/065; H01G 4/005; H01G 4/105;
(Continued)

(56) References Cited

U.S. PATENT DOCUMENTS 5,658,649 A 8/1997 Wrobleski
6,531,806 B1 3/2003 Daidai
(Continued)

FOREIGN PATENT DOCUMENTS

CN 1639815 A 7/2005
CN 102484925 A 5/2012
(Continued)

OTHER PUBLICATIONS

U.S. Notice of Allowance dated Aug. 18, 2021 issued in U.S. Appl. No. 16/836,342.
(Continued)

*Primary Examiner* — Timothy J Thompson
*Assistant Examiner* — Guillermo J Egoavil
(74) *Attorney, Agent, or Firm* — Morgan, Lewis & Bockius LLP

(57) ABSTRACT

A multilayer electronic component includes a body including a dielectric layer and an internal electrode; and an external electrode including an electrode layer disposed on the body and connected to the internal electrode and a conductive resin layer disposed on the electrode layer, and the conductive resin layer includes a metal wire, a conductive metal, and a base resin.

25 Claims, 6 Drawing Sheets

(51) Int. Cl.
*H01G 4/12* (2006.01)
*H01G 4/30* (2006.01)
*H05B 33/28* (2006.01)

(58) Field of Classification Search
CPC ........ H01G 4/12; H01G 4/232; H01G 4/2325;
H01G 4/30; H01G 4/306; H01G 4/1218;
H01G 4/228; H05B 33/28
USPC ......... 361/306.3, 321.2, 301.4, 321.5, 321.4;
174/260
See application file for complete search history.

(56) References Cited

U.S. PATENT DOCUMENTS

| | | | |
|---|---|---|---|
| 8,552,637 | B2 | 10/2013 | Yamamoto |
| 2005/0083637 | A1 | 4/2005 | Yoshll et al. |
| 2008/0251894 | A1* | 10/2008 | Kojima ............... H01L 21/6835 257/659 |
| 2008/0265437 | A1* | 10/2008 | Shiraishi ................ H01L 24/83 257/E21.511 |
| 2012/0119643 | A1 | 5/2012 | Yamamoto |
| 2013/0122279 | A1* | 5/2013 | Tsujimoto ................ H01B 1/22 428/688 |
| 2014/0043724 | A1 | 2/2014 | Kang et al. |
| 2015/0068794 | A1 | 3/2015 | Kang et al. |
| 2016/0027583 | A1 | 1/2016 | Ahn et al. |
| 2016/0374615 | A1 | 12/2016 | Tsukada |
| 2017/0278639 | A1 | 9/2017 | Tsubaki |
| 2017/0301468 | A1* | 10/2017 | Kim ..................... H01G 4/2325 |
| 2019/0027309 | A1 | 1/2019 | Lee et al. |
| 2020/0185153 | A1 | 6/2020 | Yun |

FOREIGN PATENT DOCUMENTS

| | | | | |
|---|---|---|---|---|
| CN | 104103421 | A | | 10/2014 |
| CN | 104465076 | A | | 3/2015 |
| JP | H11126731 | A | * | 5/1999 ............... H01G 4/40 |
| KR | 10-2014-0021416 | A | | 2/2014 |
| KR | 10-2014-0032212 | A | | 3/2014 |
| KR | 20140032212 | A | * | 3/2014 ............. H05K 1/092 |
| KR | 10-1520571 | B1 | | 5/2015 |
| KR | 10-2019-0009624 | A | | 1/2019 |

OTHER PUBLICATIONS

U.S. Office Action dated Jun. 3, 2021 issued in U.S. Appl. No. 16/836,342.
First Chinese Office Action dated Jul. 21, 2022 issued in Chinese Patent Application No. 202010517359.1 (with English translation).

* cited by examiner

I - I'

MULTILAYER ELECTRONIC COMPONENT

CROSS-REFERENCE TO RELATED APPLICATION(S)

This application is a continuation of U.S. patent application Ser. No. 16/836,342, filed on Mar. 31, 20220, which claims benefit of priority to Korean Patent Application No. 10-2019-0109673 filed on Sep. 4, 2019 in the Korean Intellectual Property Office, the disclosures of which are incorporated herein by reference in their entireties.

TECHNICAL FIELD

The present disclosure relates to a multilayer electronic component.

BACKGROUND

A multilayer ceramic capacitor (MLCC), a multilayer electronic component, is a chip-type condenser mounted on the printed circuit boards of a variety of electronic products including imaging devices, such as a liquid crystal display (LCD), a plasma display panel (PDP), and the like, computers, smartphones, mobile phones, and the like, and may be configured to charge or discharge the devices.

A multilayer ceramic capacitor may be used as a component of various electronic devices as a multilayer ceramic capacitor is relatively small in size, may secure high capacity and may be easily mounted. As electronic devices such as computers, mobile devices, and the like, have been designed to have reduced sizes and to operate at high power, there has been increased demand for miniaturization and high capacity of multilayer ceramic capacitors.

Also, recently, there has been increased interest in electrical components for vehicles, and multilayer ceramic capacitors have been required to have high reliability and high strength properties to be used in vehicles or information systems.

To implement high reliability, however, issues such as permeation of a plating solution, cracks caused by external impacts, may occur during manufacturing processes.

To address the above-described issues, a resin composition including a conductive material may be applied between an electrode layer and a plating layer of an external electrode to absorb external impacts and to prevent permeation of a plating solution, thereby improving reliability.

However, higher reliability has been required in relation to external physical impacts, and to secure higher reliability, higher durability against warpage has been required.

SUMMARY

An aspect of the present disclosure is to provide a multilayer electronic component having improved durability against warpage.

An aspect of the present disclosure is to provide a multilayer electronic component having improved electrical properties.

According to an aspect of the present disclosure, a multilayer electronic component includes a body including a dielectric layer and an internal electrode; and an external electrode including an electrode layer disposed on the body and connected to the internal electrode and a conductive resin layer disposed on the electrode layer, and the conductive resin layer includes a metal wire, a conductive metal, and a base resin.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
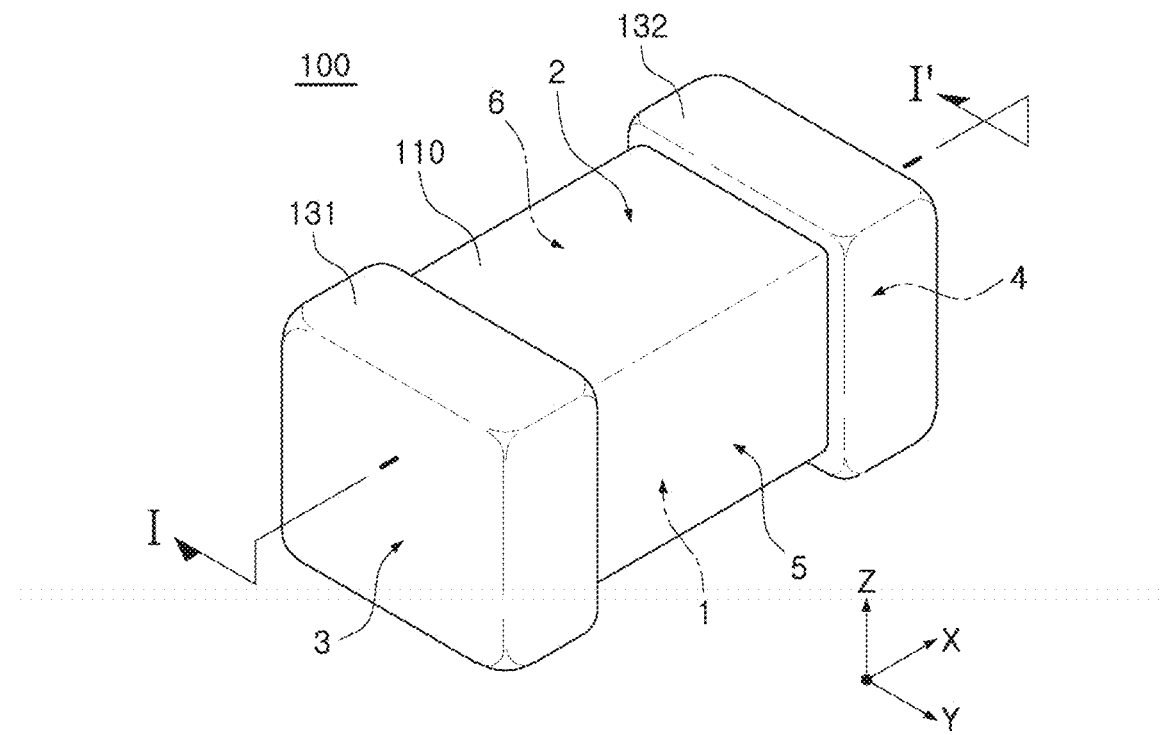
FIG. 1 is a perspective diagram illustrating a multilayer electronic component according to an example embodiment in the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clarity of description, and elements indicated by the same reference numeral are the same elements in the drawings.

In the drawings, certain elements may be omitted to allow the present disclosure to be clearly described, and to clearly express a plurality of layers and areas, thicknesses may be magnified. The same elements having the same function within the scope of the same concept will be described using the same reference numerals. Further, throughout the specification, it will be understood that when a portion "includes" an element, it can further include another element, not excluding another element, unless otherwise indicated.

In the drawing, an X direction is a second direction, an L direction, or a length direction, a Y direction is a third direction, a W direction, or a width direction, and a Z direction is a first direction, a layering direction, a T direction, or a thickness direction.

Multilayer Electronic Component

FIG. 1 is a perspective diagram illustrating a multilayer electronic component according to an example embodiment.

Figure 2:
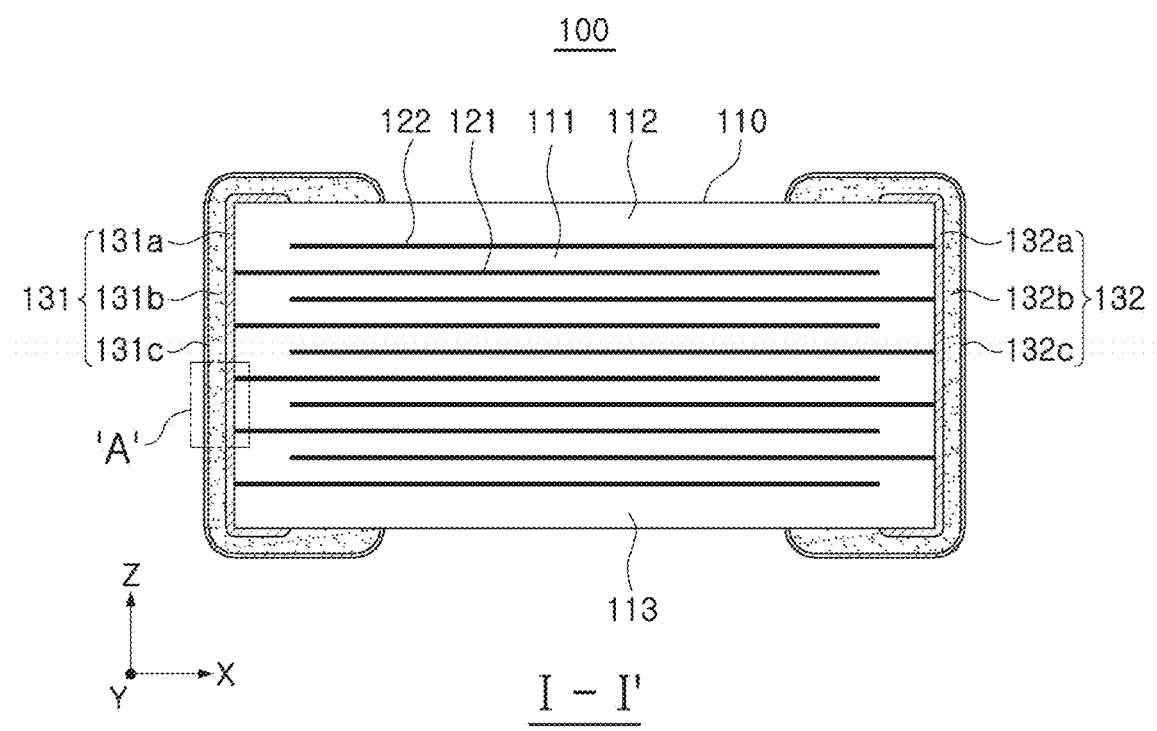
FIG. 2 is a cross-sectional diagram along line I-I' in FIG. 1.

FIG. 2 is a cross-sectional diagram taken along line I-I' in FIG. 1.

Figure 3A:
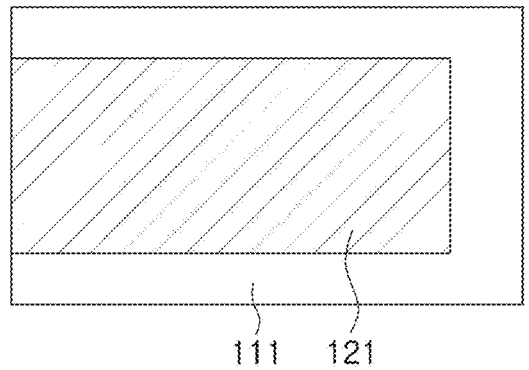
FIG. 3A is a diagram illustrating a dielectric layer on which a first internal electrode is printed.
Figure 3B:
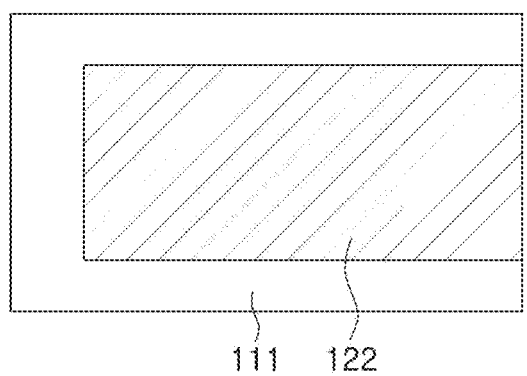
FIG. 3B is a diagram illustrating a dielectric layer on which a second internal electrode is printed.

FIG. 3A is a diagram illustrating a dielectric layer on which a first internal electrode is printed, and FIG. 3B is a diagram illustrating a dielectric layer on which a second internal electrode is printed.

Figure 4:
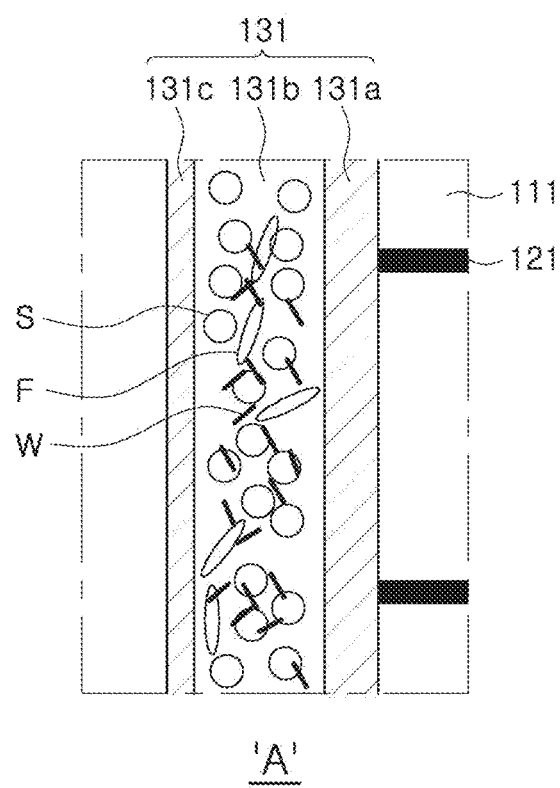
FIG. 4 is an enlarged diagram illustrating region A illustrated in FIG. 2.

FIG. 4 is an enlarged diagram illustrating region A illustrated in FIG. 2.

In the description below, a multilayer electronic component will be described in accordance with an example embodiment with reference to FIGS. 1 to 4.

A multilayer electronic component 100 in the example embodiment may include a body 110 including a dielectric layer 111 and internal electrodes 121 and 122, and external electrodes 131 and 132 including electrode layers 131a and 132a disposed on the body 110 and connected to the internal electrodes 121 and 122 and conductive resin layers 131b and 132b disposed on the electrode layers 131a and 132a, and the conductive resin layers 131b and 132b may include a metal wire W, conductive metals S and F, and a base resin.

In the body 110, the dielectric layer 111 and the internal electrodes 121 and 122 may be alternately layered.

The body 110 may not be limited to any particular shape. As illustrated in the diagram, the body 110 may have a hexahedral shape or a shape similar to a hexahedron. Due to contraction of ceramic powder particles included in the body 110 during a sintering process, the body 110 may not have an exactly hexahedral shape with straight lines, but may have a substantially hexahedral shape.

The body 110 may have first and second surfaces 1 and 2 opposing each other in a thickness direction (Z direction), third and fourth surfaces 3 and 4 connected to the first and second surfaces 1 and 2 and opposing each other in a length direction (X direction), and fifth and sixth surfaces 5 and 6 connected to the first and second surfaces 1 and 2 and the third and fourth surfaces 3 and 4 and opposing each other in a width direction (Y direction).

The plurality of the dielectric layers 111 forming the body 110 may be in a sintered state, and may be integrated such that boundaries between adjacent dielectric layers 111 may be difficult to identify without using a scanning electron microscope (SEM).

According to the exemplary embodiment, a material of the dielectric layer 111 may not be limited to any particular material as long as sufficient capacitance is able to be obtained. For example, as the material, a barium titanate material, a Perovskite material compound with lead (Pb), a strontium titanate material, or the like, may be used.

As the material of the dielectric layer 111, various ceramic additives, organic solvents, plasticizers, coupling agents, dispersing agents, and the like, may be added in addition to barium titanate (BaTiO3) powder, or the like, depending on an intended purpose.

The body 110 may include a capacitance forming portion disposed in the body 110 and forming capacitance including the first internal electrode 121 and the second internal electrode 122 opposing each other with the dielectric layer 111 interposed therebetween, and cover portions 112 and 113 disposed on and below the capacitance forming portion.

The capacitance forming portion is configured to contribute to forming capacitance of the capacitor, and may be formed by alternatively disposing a plurality of the first and second internal electrodes 121 and 122 with the dielectric layer 111 interposed therebetween.

The upper cover portion 112 and the lower cover portion 113 may be formed by disposing a single dielectric layer or layering two or more dielectric layers on upper and lower surfaces of the capacitance forming portion, respectively, and may prevent damage to an internal electrode caused by physical or chemical stress.

The upper cover portion 112 and the lower cover portion 113 may not include an internal electrode, and may include a material the same as a material of the dielectric layer 111.

The plurality of internal electrodes 121 and 122 may be disposed to oppose each other with the dielectric layer 111 interposed therebetween.

The internal electrodes 121 and 122 may include the first and second internal electrodes 121 and 122 alternatively disposed to oppose each other with the dielectric layer 111 interposed therebetween.

The first and second internal electrodes 121 and 122 may be exposed to the third and fourth surfaces 3 and 4 of the body 110, respectively.

Referring to FIG. 2, the first internal electrode 121 may be spaced apart from the fourth surface 4 and may be exposed through the third surface 3, and the second internal electrode 122 may be spaced apart from the third surface 3 and may be exposed through the fourth surface 4. The first external electrode 131 may be disposed on the third surface 3 of the body and may be connected to the first internal electrode 121, and the second external electrode 132 may be disposed on the fourth surface 4 of the body and may be connected to the second internal electrode 122.

The first and second internal electrodes 121 and 122 may be electrically isolated from each other with the dielectric layer 111 interposed therebetween.

Referring to FIGS. 3A and 3B, the body 110 may be formed by alternatively layering the dielectric layer 111 on which the first internal electrode 121 is printed and the dielectric layer 111 on which the second internal electrode 122 is printed in the thickness direction (Z direction) and performing a sintering process.

A material of the first and second internal electrodes 121 and 122 may not be limited to any particular material. For example, the first and second internal electrodes 121 and 122 may be formed using a conductive paste including one or more of noble materials such as palladium (Pd), palladium-silver (Pd—Ag), and nickel (Ni) and copper (Cu), for example.

As a method of printing the conductive paste, a screen-printing method, a gravure printing method, or the like, may be used, but the method is not limited thereto.

The external electrodes 131 and 132 may be disposed in the body 110 and may be connected to the internal electrodes 121 and 122, respectively. As illustrated in FIG. 2, the external electrodes 131 and 132 may include the first and second external electrodes 131 and 132 connected to the first and second internal electrodes 121 and 122, respectively.

The first and second external electrodes 131 and 132 may be electrically connected to the first and second internal electrodes 121 and 122, respectively, to form capacitance, and the second external electrode 132 may be connected to a potential different from a potential to which the first external electrode 131 is connected.

The external electrodes 131 and 132 may include electrode layers 131a and 132a connected to the internal electrodes 121 and 122 and conductive resin layers 131b and 132b disposed on the electrode layers.

The electrode layers 131a and 132a may include a conductive metal and glass.

A conductive metal used for the electrode layers 131a and 132a may not be limited to any particular material, and a material which may be electrically connected to the internal electrodes to form capacitance may be used. For example, the material may be one or more elements selected from a group consisting of copper (Cu), silver (Ag), nickel (Ni), and alloys thereof.

The electrode layers 131a and 132a may be formed by applying a conductive paste prepared by adding glass frit to the conductive metal power and performing a sintering process.

The electrode layers 131a and 132a may include a metal wire W, conductive metals S and F, and a base resin.

The conductive metals S and F may be electrically connected to the electrode layers 131a and 132a, and the base resin may secure adhesiveness and may absorb impacts.

The metal wire W may perform a buffering action with respect to external physical impacts and may absorb impacts. Accordingly, the metal wire W may improve durability against warpage of a multilayer electronic component.

The metal wire W may have a thin thread shape such that a relatively small amount of the metal wire W may reduce equivalent series resistance (ESR), and may effectively improve electrical connection between the conductive resin layers 131b and 132b and the electrode layers 131a and 132a.

As a material of the metal wire W, a metal having conductivity may be applied, and the material may not be limited to any particular material. For example, the metal wire W may include one or more element from a group consisting of silver (Ag), copper (Cu), nickel (Ni), or alloys thereof.

A diameter of the metal wire W may be 5 nm or more and 300 nm or less.

When a diameter of the metal wire W is less than 5 nm, manufacturing costs may increase, and it may be difficult to maintain a shape of the metal wire W. When a diameter of the metal wire W exceeds 300 nm, the effect of improvement in durability against warpage and electrical connection may degrade.

A length of the metal wire W may be 50 nm or more and 100 µm or less.

When a length of the metal wire W is less than 50 nm, the effect of improvement in durability against warpage and electrical connection may degrade. When a length of the metal wire W exceeds 100 µm, an effect relative to a content added due to agglomeration with the other metal wire may decrease.

A ratio of a length to a diameter of the metal wire W (a length/a diameter) may be 10 or greater and 1200 or less.

When the ratio of a length to a diameter of the metal wire W (a length/a diameter) is less than 10, the effect of improvement in durability against warpage and electrical connection may degrade. When the ratio of a length to a diameter of the metal wire W (a length/a diameter) exceeds 1200, the effect relative to a content added due to agglomeration with the other metal wire may decrease.

A ratio of a mass of the metal wire W to a sum of a mass of the metal wire W and a mass of the conductive metals S and F, included in the conductive resin layers 131b and 132b, may be 0.1 wt % or more and less than 5 wt %.

When the ratio of a mass of the metal wire W is less than 0.1 wt %, the effect of improvement in durability against warpage and electrical connection may not be sufficiently implemented. When the ratio of a mass of the metal wire W is 5 wt % or more, it may be difficult for the effect of improvement in durability against warpage and electrical connection to further increase, and cracks may be created in the body 110.

Figure 5A:
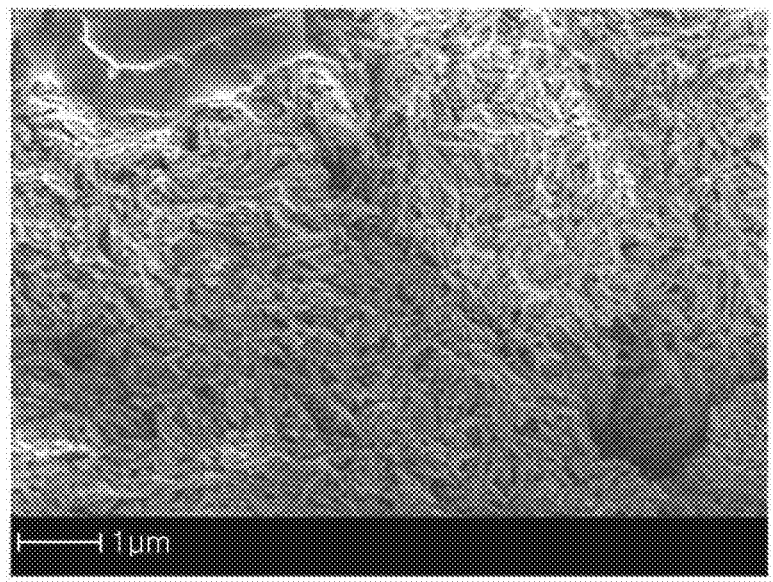
FIG. 5A is an image of an example of a form of a metal wire used in a multilayer electronic component of the present disclosure.

As an example of the metal wire W, as illustrated in FIG. 5A illustrating an image of an example of a form of the metal wire used in the multilayer electronic component in the example embodiment, the metal wire W may be formed of silver (Ag), and a diameter may be 40 nm approximately, and a length may be 40 µm approximately.

Figure 5B:
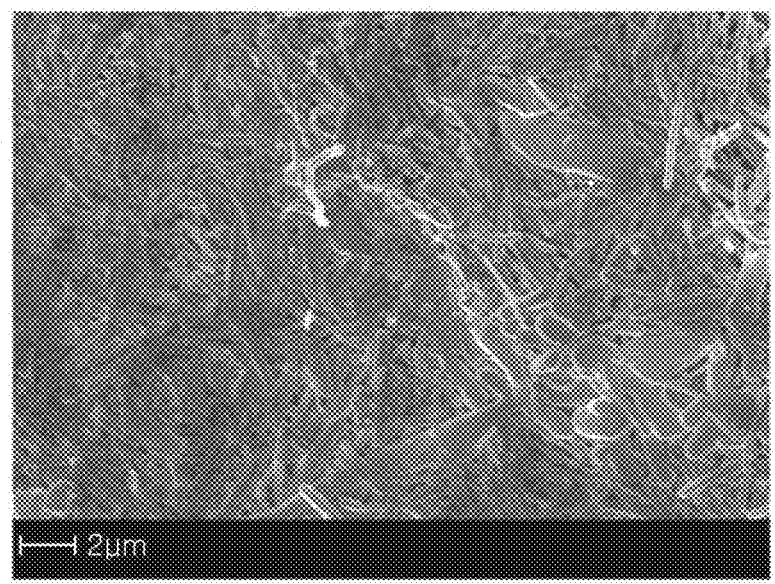
FIG. 5B is an image of another example of a form of a metal wire used in a multilayer electronic component of the present disclosure.

Also, as illustrated in FIG. 5B, an image of another example of a form of the metal wire used in the multilayer electronic component in the example embodiment, the metal wire W may be formed of silver (Ag), and a diameter may be 60 to 150 nm approximately, and a length may be 5 to 30 µm approximately.

One or more metal wires W may be disposed in an area of 10 µm×10 µm (a horizontal side X a vertical side) on a cross-sectional surface of the conductive resin layer. When less than one metal wire W is disposed, the effect of improvements in durability against warpage and electrical connection may not be sufficiently implemented.

Figure 6:
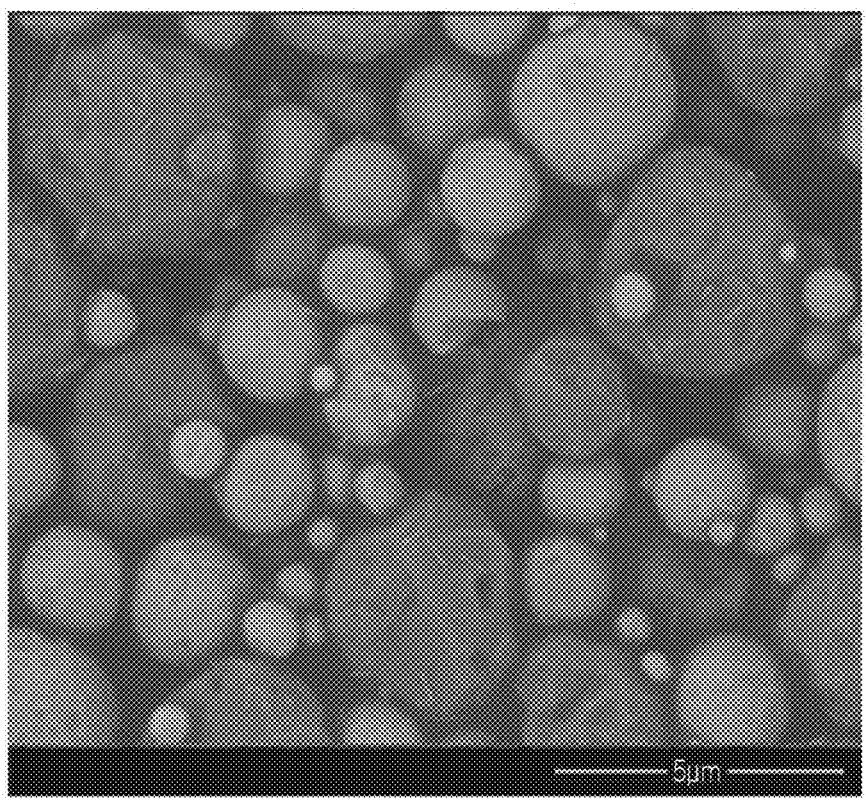
FIG. 6 is an image of a cross-sectional surface of a conductive resin layer according to an example embodiment in the present disclosure.

FIG. 6 is an image of a cross-sectional surface of a conductive resin layer according to an example embodiment. Referring to FIG. 6, it is indicated that at least one metal wire may be disposed in an area of 10 µm×10 µm (a horizontal side X a vertical side) on a cross-sectional surface of the conductive resin layer in the example embodiment.

The conductive metals S and F may electrically connect the conductive resin layers 131b and 132b to the electrode layers 131a and 132a.

The conductive metals S and F may include one or more of spherical powder S and flake powder F. Accordingly, the conductive metals S and F may only include flake powder, or may only include spherical powder, or may include a mixture of flake powder and spherical powder.

The spherical powder may also include powder particles which do not have a completely spherical shape. For example, the spherical powder may include powder particles each having a length ratio between a major axis and a minor axis (a major axis/a minor axis) of 1.45 or lower. According to one embodiment of the present disclosure, a major axis may refer to the largest dimension across a center of a particle, and a minor axis may refer to the smallest dimension across the center of the particle.

The flake powder may refer to powder particles each having a flat and elongated shape. For example, a length ratio between a major axis and a minor axis (a major axis/a minor axis) of a particle of the flake powder may be 1.95 or higher, but the ratio is not limited thereto.

As the metal wire has a thin thread shape, and also a diameter of the metal wire is smaller than a minor axis of a particle of the flake powder, the metal wire may have a shape sufficiently distinct on a cross-sectional surface of the conductive resin layer.

An average particle size of a particle of the spherical powder may be 300 nm to 30 µm.

Also, a minor axis of a particle of the flake powder may be 300 nm or greater. As a minor axis of a particle of the flake powder has a value sufficiently greater than a diameter of the metal wire, particles of the flake powder and the metal wire may be clearly distinct from each other on a cross-sectional surface of the conductive resin layer.

For example, a minor axis of a particle of the flake powder may be 300 nm to 30 µm, and a major axis may be 500 nm to 30 µm.

A length of each of a major axis and a minor axis of a particle of the spherical powder S and of a particle of the flake powder F may be measured from an image obtained by scanning a cross-sectional surface (an L-T cross-sectional surface) of a central portion of the multilayer electronic component 100 taken in the width (Y) direction using a scanning electron microscope (SEM).

A material of the spherical powder S and the flake powder F may not be limited to any particular material as along as the material is able to be electrically connected to the electrode layers 131a and 132a. For example, the material of the spherical powder S and the flake powder F may include one or more elements selected from a group consisting of copper (Cu), silver (Ag), nickel (Ni), alloys thereof, for example.

A base resin included in the conductive resin layers 131b and 132b may not be limited to any particular material as long as the material has adhesiveness and impact absorption properties and is able to be used to make a paste by being mixed with conductive metal powder. For example, the base resin may include an epoxy-based resin, for example.

The external electrodes 131 and 132 may include the first and second external electrodes 131 and 132 disposed on the third and fourth surfaces 3 and 4, respectively.

The first external electrode 131 may include a connection portion disposed on the third surface of the body and a band portion extending to a portion of each of the first and second surfaces from the connection portion. Similarly, the second external electrode 132 may include a connection portion disposed on the fourth surface of the body, and a band portion extending to a portion of each of the first and second surfaces from the connection portion.

The band portion may extend to the portion of each of the first and second surfaces 1 and 2 from the connection portion, and may also extend to a portion of each of the fifth and sixth surfaces 5 and 6 from the connection portion.

The external electrodes 131 and 132 may further include plating layers 131c and 132c disposed on the conductive resin layers 131b and 132b to improve mounting properties.

For example, the plating layers 131c and 132c may be configured as Ni plating layers or Sn plating layers. Ni plating layers or Sn plating layers may be formed in order on the conductive resin layers 131b and 132b, or a plurality of Ni plating layers and/or Sn plating layers may be included.

EXPERIMENTAL EXAMPLE

Figure 7:
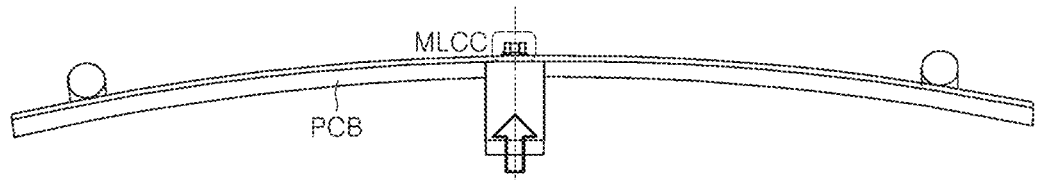
FIG. 7 is a diagram illustrating a method of a bending test.
Figure 8:
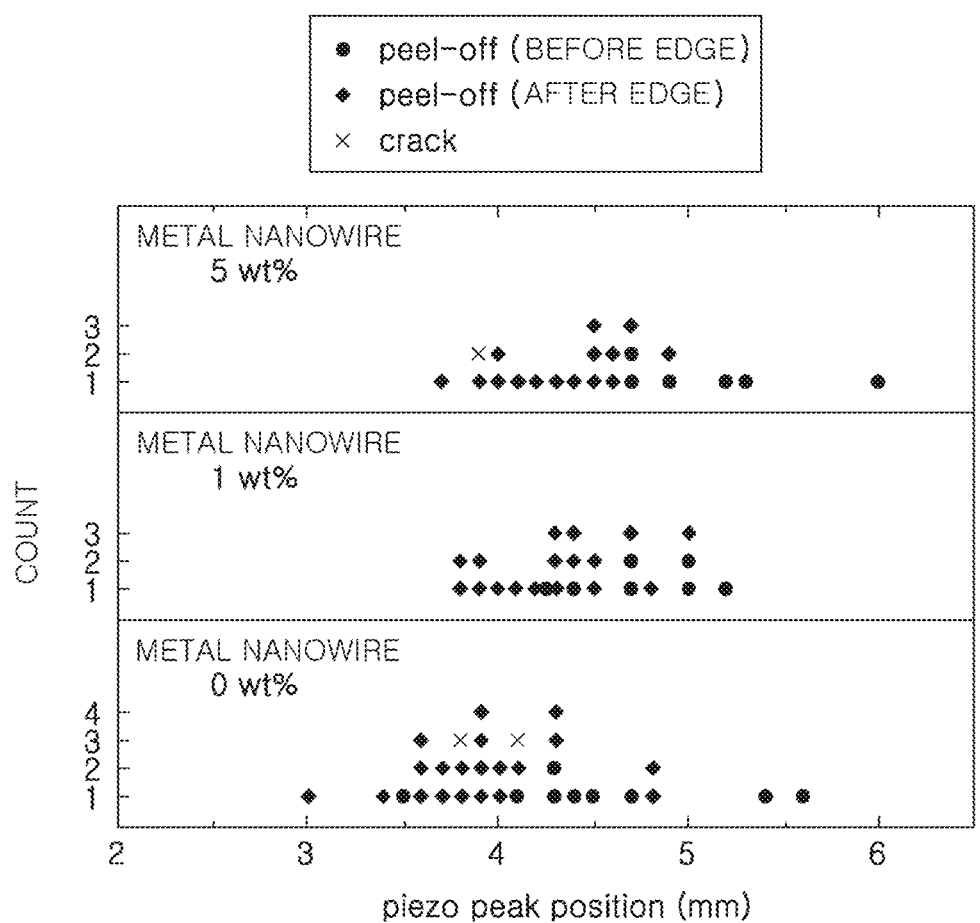
FIG. 8 is a graph illustrating a result of a bending test using the test method illustrated in FIG. 7.

FIGS. 7 and 8 illustrate a method of a bending test in accordance with a ratio of a mass of a metal wire to a sum of amass of a metal wire and a mass of a conductive metal, included in a conductive resin layer, and a result of the bending test.

FIG. 7 is a diagram illustrating a method of a bending test. FIG. 8 is a graph illustrating a result of a bending test using the test method illustrated in FIG. 7.

Sample chips having ratios of a mass of the metal wire to a sum of a mass of a metal wire and a mass of a conductive metal, included in a conductive resin layer, to be 0 wt %, 1 wt %, and 5 wt %, respectively, were prepared.

Referring to FIG. 7, a sample chip (MLCC) was mounted on a substrate (PCB), and a point at which a peel-off in which a resin layer of an external electrode was separated from a body or cracks were created in the body while pressing a surface opposite to the mounting surface of the sample chip (MLCC) to the maximum, 6 mm, was indicated as a piezo peak position in FIG. 8.

Referring to FIG. 8, when a content of the metal wire was 0 wt %, the number of the samples in which the peel-off occurred was 27 among thirty samples, and the number of the samples in which cracks were created was two.

When a content of the metal wire was 1 wt %, the number of the samples in which a peel-off occurred was 24 among the thirty samples, and the number of the samples in which cracks were created was 0.

When a content of the metal wire was 5 wt %, the number of the samples in which a peel-off occurred was 21 among thirty samples, and the number of the samples in which cracks were created was 1.

It has been indicated that, as a content of the metal wire increased, the number of the samples in which a peel-off occurred decreased, and an average value of the piezo peak position increased.

When a content of the metal wire was 5 wt %, the sample in which cracks were created in the body was present. Thus, a preferable content of the metal wire is less than 5 wt %.

According to the aforementioned example embodiments, by including the metal wire in a conductive resin layer of an external electrode, a multilayer electronic component having improved durability against warpage may be provided.

Also, by including the metal wire in the conductive resin layer of the external electrode, a multiplayer electronic component having improved electrical properties may be provided.

While the exemplary embodiments have been shown and described above, it will be apparent to those skilled in the art that modifications and variations could be made without departing from the scope of the present invention as defined by the appended claims.

What is claimed is:

1. A multilayer electronic component, comprising:
   a body including a dielectric layer and an internal electrode; and
   an external electrode including an electrode layer disposed on the body and connected to the internal electrode and a conductive resin layer disposed on the electrode layer,
   wherein the conductive resin layer includes a metal wire wherein a ratio of a length of the metal wire to a diameter of the metal wire, a length/a diameter, is 10 or more and 1200 or less, and
   wherein one or more of the metal wires are disposed in an area of 10 μm×10 μm, a horizontal side X a vertical side, on a cross-sectional surface of the conductive resin layer.

2. The multilayer electronic component of claim 1, wherein the metal wire includes one or more element selected from a group consisting of Ag, Cu, Ni, and alloys thereof.

3. The multilayer electronic component of claim 1, wherein the conductive resin layer includes a base resin.

4. The multilayer electronic component of claim 1, wherein a length of the metal wire is 50 nm or more and 100 μm or less.

5. The multilayer electronic component of claim 1, wherein a ratio of a mass of the metal wire to a sum of a mass of the metal wire and a mass of conductive metal, included in the conductive resin layer, is 0.1 wt % or more and less than 5 wt %.

6. The multilayer electronic component of claim 1, wherein the conductive metal comprises one or more of spherical powder and flake powder.

7. The multilayer electronic component of claim 6, wherein a length ratio between a major axis and a minor axis, a major axis/a minor axis, of a particle of the spherical powder is 1.45 or less, and wherein a length ratio between a major axis and a minor axis, a major axis/a minor axis, of a particle of the flake powder is 1.95 or less.

8. The multilayer electronic component of claim 6, wherein a minor axis of a particle of the flake powder is 300 nm or greater.

9. The multilayer electronic component of claim 6, wherein an average particle size of a particle of the spherical powder is 300 nm or greater.

10. The multilayer electronic component of claim 1, wherein the electrode layer includes another conductive metal and glass.

11. The multilayer electronic component of claim 1, wherein the external electrode further includes a plating layer disposed on the conductive resin layer.

12. The multilayer electronic component of claim 1, wherein a minor axis of the conductive metal is greater than a diameter of the metal wire.

13. A multilayer electronic component, comprising:
a body including a dielectric layer and an internal electrode; and
an external electrode including an electrode layer disposed on the body and connected to the internal electrode and a conductive resin layer disposed on the electrode layer,
wherein the conductive resin layer includes a metal wire,
wherein a ratio of a mass of the metal wire to a sum of a mass of the metal wire and a mass of conductive metal, included in the conductive resin layer, is 0.1 wt % or more and less than 5 wt %.

14. The multilayer electronic component of claim 13, wherein the metal wire includes one or more element selected from a group consisting of Ag, Cu, Ni, and alloys thereof.

15. The multilayer electronic component of claim 13, wherein a diameter of the metal wire is 5 nm or more and 300 nm or less.

16. The multilayer electronic component of claim 13, wherein the conductive resin layer includes a base resin.

17. The multilayer electronic component of claim 13, wherein a ratio of a length of the metal wire to a diameter of the metal wire, a length/a diameter, is 10 or more and 1200 or less.

18. The multilayer electronic component of claim 13, wherein one or more of the metal wires are disposed in an area of 10 µm×10 µm, a horizontal side X a vertical side, on a cross-sectional surface of the conductive resin layer.

19. The multilayer electronic component of claim 13, wherein the conductive metal comprises one or more of spherical powder and flake powder.

20. The multilayer electronic component of claim 19,
wherein a length ratio between a major axis and a minor axis, a major axis/a minor axis, of a particle of the spherical powder is 1.45 or less, and
wherein a length ratio between a major axis and a minor axis, a major axis/a minor axis, of a particle of the flake powder is 1.95 or less.

21. The multilayer electronic component of claim 19, wherein a minor axis of a particle of the flake powder is 300 nm or greater.

22. The multilayer electronic component of claim 19, wherein an average particle size of a particle of the spherical powder is 300 nm or greater.

23. The multilayer electronic component of claim 13, wherein the electrode layer includes another conductive metal and glass.

24. The multilayer electronic component of claim 13, wherein the external electrode further includes a plating layer disposed on the conductive resin layer.

25. The multilayer electronic component of claim 13, wherein a minor axis of the conductive metal is greater than a diameter of the metal wire.

* * * * *